United States Patent [19]
Huang

[11] Patent Number: 6,095,471
[45] Date of Patent: Aug. 1, 2000

[54] IN-VEHICLE CUP HOLDER

[76] Inventor: Pei-Hsiu Huang, 4F, No 12-1, Alley 15, Lane 214, Sanchung, Taiwan

[21] Appl. No.: 09/129,415

[22] Filed: Aug. 5, 1998

[51] Int. Cl.[7] ........................................... A47K 1/08
[52] U.S. Cl. ................... 248/311.2; 248/150; 248/291.1; 224/400; 224/926; 297/188.16
[58] Field of Search ................. 282/80, 87; 297/188.15, 297/188.16; 224/400, 926; 248/311.2, 291.1, 150

[56] References Cited

U.S. PATENT DOCUMENTS

| | | | |
|---|---|---|---|
| 5,087,008 | 2/1992 | Miller et al. | 248/311.2 |
| 5,503,297 | 4/1996 | Frankel | 220/751 |
| 5,657,893 | 8/1997 | Hitchings | 220/326 |
| 5,673,890 | 10/1997 | Duesterberg | 248/311.2 |
| 5,718,405 | 2/1998 | Adachi | 248/311.2 |
| 5,800,011 | 9/1998 | Spykerman | 297/188.19 |
| 5,813,645 | 9/1998 | Droste et al. | 248/311.2 |
| 5,876,007 | 3/1999 | Lancaster et al. | 248/311.2 |

Primary Examiner—Ramon O. Ramirez
Assistant Examiner—Walter Landry
Attorney, Agent, or Firm—Jacobson, Price, Holman & Stern, PLLC

[57] ABSTRACT

The invention herein relates to a kind of improved in-vehicle cup holder and the aforesaid in-vehicle cup holder is mainly comprised of a mounting plate, a cover plate, a left clip arm, a right clip arm and clip arm rod, and is innovative in that protruding knobs of a general hemispherical shape are molded onto each of the initial exterior ends of the lock tabs extending from the two lateral walls of the mounting plate body; furthermore, one hole is fabricated into each of the two lateral containment edges of the aforesaid cover plate body in an aligned configuration; such that at the completion of usage, the aforesaid cover plate is closed onto the aforesaid mounting plate and held securely in position by means of the aforesaid two lock tabs which are clasped to the aforesaid cover plate, thereby preventing the occurrence of separation, opening and falling; and, furthermore, will not vibrate or produce unpleasant sounds even in a moving vehicle.

5 Claims, 3 Drawing Sheets

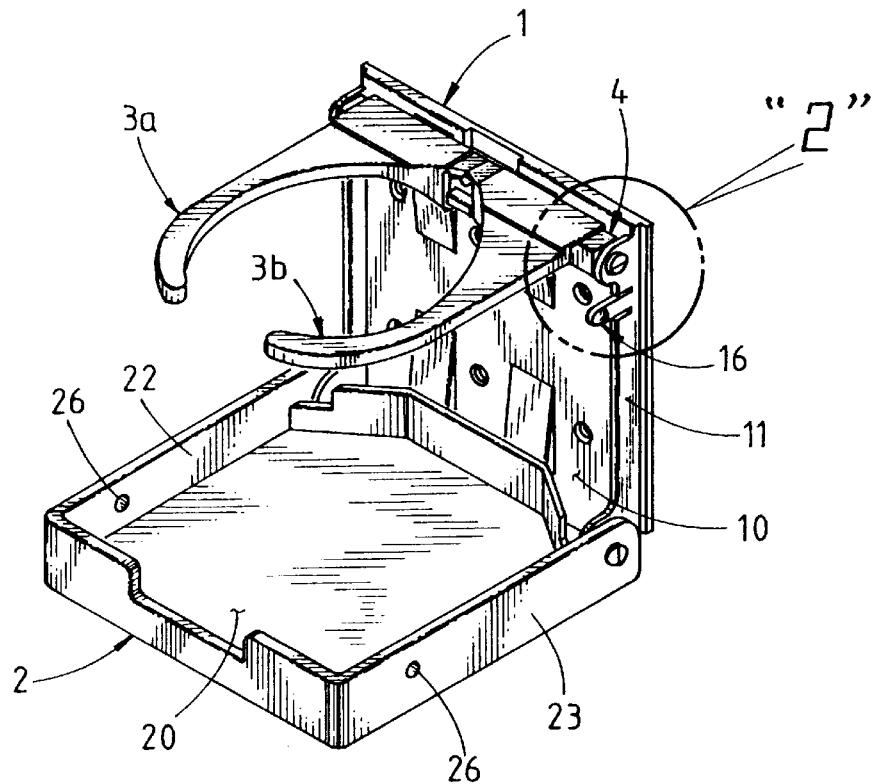
Fig 1
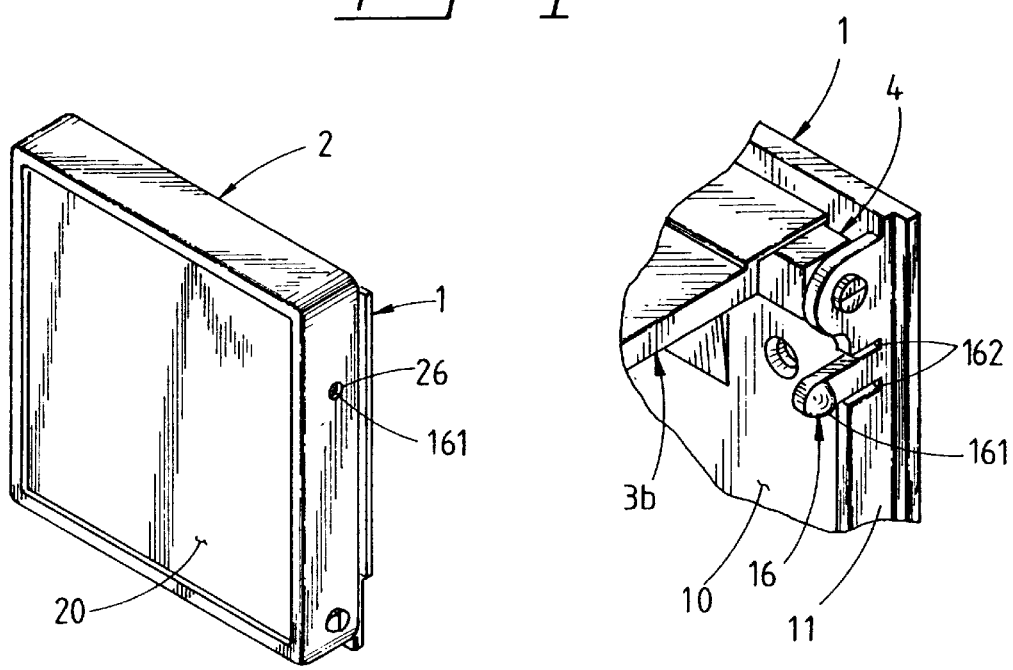
Fig 3
Fig 2

IN-VEHICLE CUP HOLDER

BACKGROUND OF THE INVENTION

The invention herein relates to an improvement of the "Adjustable In-vehicle Cup Holder" invention registered under U.S. Pat. No. 5,072,909, specifically referring to a kind of improved in-vehicle cup holder that provides easy and secure positioning without the incidence of attachment difficulties, opening, separation and falling after usage when the cover plate is closed onto the mounting plate; furthermore, will not shake, vibrate or produce unpleasant sounds even in a moving vehicle.

The invention herein was first improved by the father of the applicant as the "Adjustable Cup Holder In The Car" (U.S. Pat. No. 5,072,909) and, as indicated in FIG. 5 and FIG. 6, was mainly comprised of a mounting plate (1), a cover plate (2), a left clip arm (3a), a right clip arm (3b), and clip arm rod (4). Although such an adjustable in-vehicle cup holder offers more practicality than conventional in-vehicle cup holders, no clasping structure or device was designed in between the mounting plate (1) and the cover plate (2) and following a certain period of usage, the mounting plate (1) deformed, or the protruding brackets (strips) (13) at the lower two sides above the protruding shaft (15) or the holes (25) in the support edges (22) and (23) at the two sides of the cover plate (2) became damaged through wear, which led to an overall structural loosening that disabled the aforesaid cover plate (2) from being securely clasped onto the aforesaid mounting plate (1) and resulted in the semi-opened situation depicted by the suppositional lines in FIG. 5 due to the impossibility of achieving the full covering of aforesaid mounting plate (1) illustrated by the real lines; in such a situation, the vibrations generated by vehicle operation and movement continuously shake the aforesaid cover plate and mounting plate apart and produces unpleasant sounds.

The applicant of the invention herein has accumulated many years of experience while assisting his father in the manufacturing and marketing of the aforementioned adjustable in-vehicle cup holder and, furthermore, has observed that the other conventional in-vehicle cup holders manufactured and sold by the same industry are affected by the aforementioned shortcomings and, therefore, conducted research and testing to develop the improved in-vehicle cup holder of the invention herein.

BRIEF DESCRIPTION OF THE DRAWINGS

FIG. 2-1 is an isometric drawing of another embodiment of the lock tab of the invention herein as depicted in a partial magnified view.

FIG. 3 is an isometric drawing of the invention herein in the post-utilization states

FIG. 4-1 is a partial isometric drawing of the third embodiment of the cover plate of the invention herein.

PARTS OF THE DRAWINGS

| | |
|---|---|
| 1-Mounting plate. | 161-Protruding knob. |
| 2-Cover plate. | 162-Intervals. |
| 3a-Left clip arm. | 163-Protruding tab. |
| 3b-Right clip arm. | 20-Cover plate body. |
| 4-Clip arm rod. | 22-Left lateral containment edge. |
| 10-Mounting plate body. | 23-Right lateral containment edge. |
| 11-Lateral wall. | 25-Hole. |
| 12-Protruding bracket (strip). | 26-Hole. |
| 13-Protruding bracket (strip). | 27-Protruding edge. |
| 15-Protruding shaft. | 28-Recess. |
| 16-Lock tab. | |

DETAILED DESCRIPTION OF THE INVENTION

Figures 1, 2:
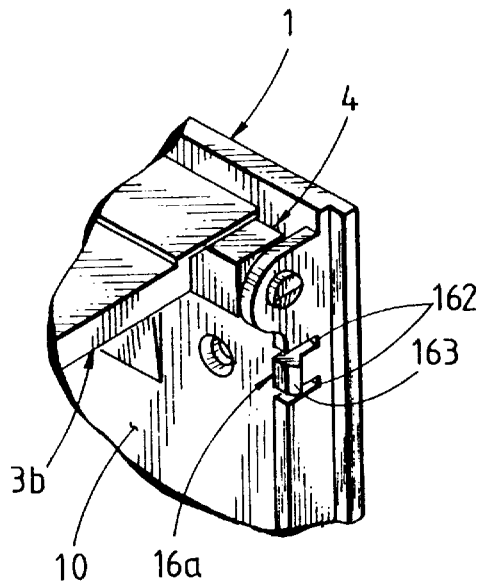
FIG. 1 is an isometric drawing of the invention herein in a state of utilization.
FIG. 2 is a partial magnified view of the isometric drawing in FIG. 1.

Referring to FIG. 1, the in-vehicle cup holder of the invention herein is mainly comprised of a mounting plate (1), a cover plate (2), a left clip arm (3a), a right clip arm (3b) and a clip arm rod (4). The aforesaid components are constructed of a plastic material and are formed by a single-step molding process; however, when the body (10) of the aforesaid mounting plate (1) is molded, two lateral walls (11) are formed onto the aforesaid body (10) and the aforesaid walls are both molded with protruding knobs (161) of a general hemispherical shape at the initial lateral exterior end of the lock tab (16) (indicated in FIG. 2); furthermore, when the body (20) of the aforesaid cover plate (2) is molded, one hole (26) is molded into each of the two lateral containment edges (22) and (23) of the aforesaid body (20) in an aligned configuration such that at the completion of usage, the protruding knobs (161) on the aforesaid two locks (16) are accurately positioned and engaged in the holes (26) on the two lateral containment edges (22) and (23) of the aforesaid cover plate (2), thereby preventing the occurrence of separation and opening (as shown by the situation depicted in FIG. 3) and, furthermore, will not vibrate or produce unpleasant sounds even in a moving vehicle, because when the aforesaid cover plate (2) is securely covered onto the mounting plate (1) the two containment edges (22) and (23) along the two sides of the cover plate body (20) are compressed and flexed inward of the lock tabs (16) at the two sides of the mounting plate (10), such that after the aforesaid cover plate (2) is fully fastened onto the aforesaid mounting plate (1), the aforesaid two lock tabs (16) are stretched open in alignment simultaneously, enabling the protruding knobs (161) outside the ends to become solidly inserted into the holes (26) in the containment edges (22) and (23) along the two sides of the aforesaid cover plate body (20), which is why the position of the aforesaid two lock tabs (16) must retain a degree of tensile flexibility; therefore, when the aforesaid lock tabs (16) are molded on the lateral walls (11) along the two sides of the aforesaid mounting plate body (10), intervals (162) must be fabricated in between the two sides of the aforesaid lock tabs (16) and the aforesaid two lateral walls (11) to enable the aforesaid lock tabs (16) to readily and flexibly slant inward and open outward.

Referring to FIG. 2-1, a partial magnified drawing of more superior embodiment of the lock tab (16a) of the invention herein, a protruding tab (163) extends horizontally from the initial lateral exterior end of the the aforesaid lock tab (16a) and is molded onto the two lateral walls (11) of the mounting plate body (10) when the mounting plate body (10) is molded; and formed on each of the two sides of the aforesaid lock tab (16a) is an interval (162) to facilitate flexible inward slanting and outward opening.

Figure 4:
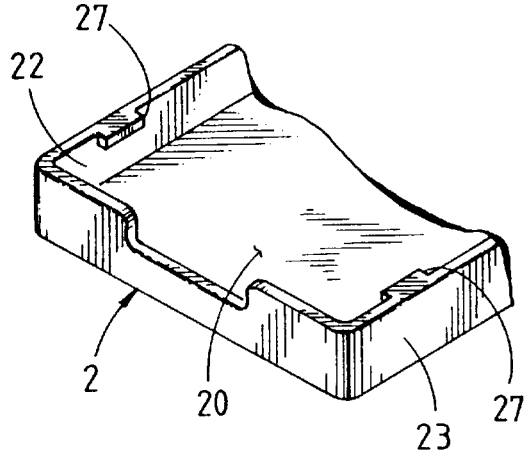
FIG. 4 is a partial isometric drawing of the second embodiment of the cover plate of the invention herein.
Figures 1, 4:
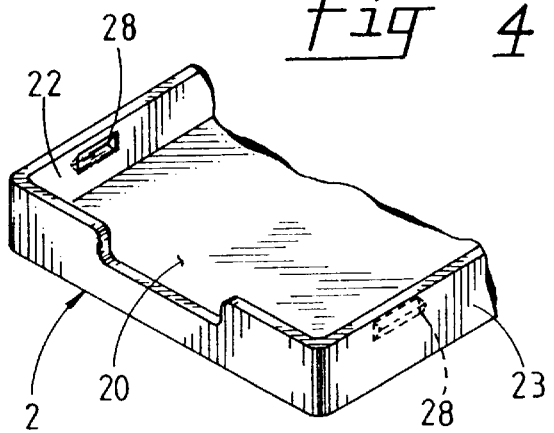
Figure 5:
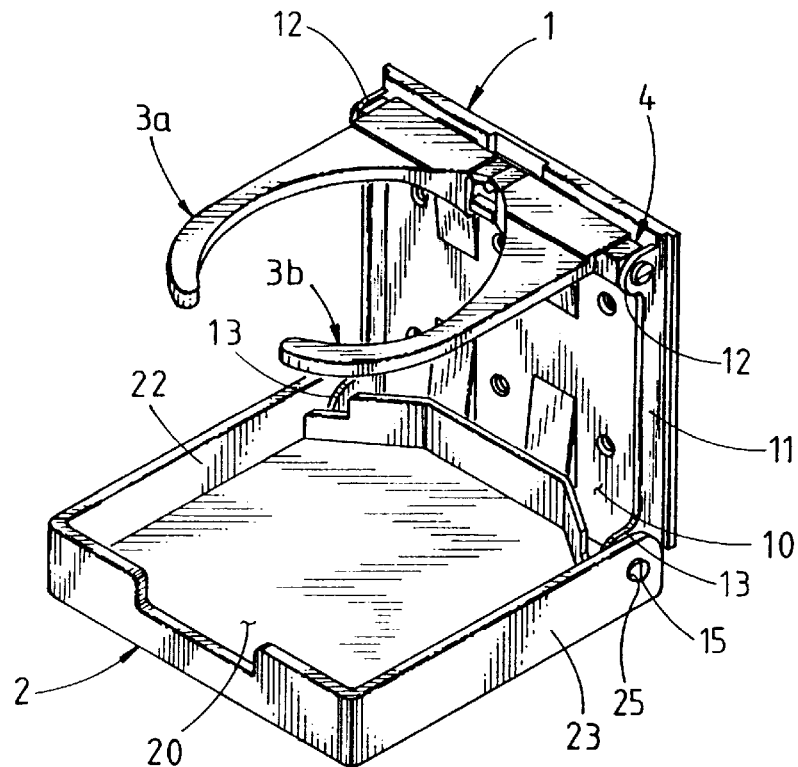
FIG. 5 is an isometric drawing of the adjustable in-vehicle cup holder registered under U.S. Pat. No. 5,072,909 in a state of utilization.
Figure 6:
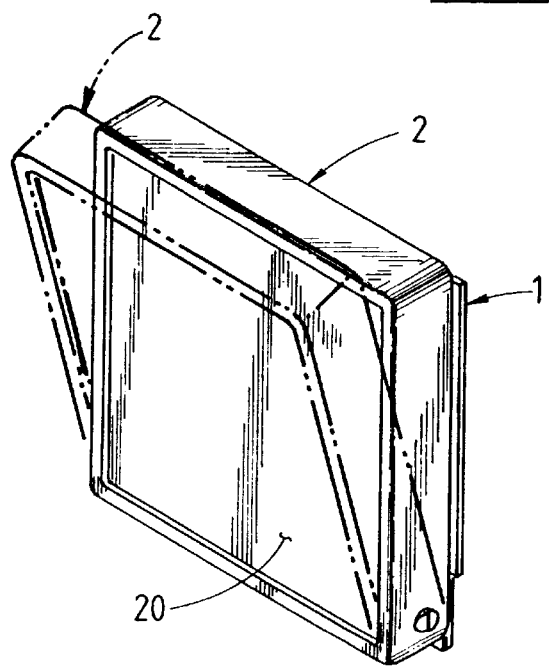
FIG. 6 is an isometric drawing of the adjustable in-vehicle cup holder under registered under U.S. Pat. No. 5,072,909 in the post-utilization state.

Referring to FIG. 4 and FIG. 4-1, when the cover plate body (20) is molded, to facilitate the placement of the aforesaid lock tab (16a), a protruding edge (27) or recess (28) must be molded laterally inside each of the two lateral containment edges (22) and (23) of the aforesaid cover plate (2) to enable, when the aforesaid cover plate (2) is closed over the mounting (1) after usage, the protruding tabs (163) on the aforesaid two lock tabs (16a) to be accurately positioned and engaged with the protruding edge (27) or recess (28) on the two lateral containment edges (22) and (23) of the aforesaid cover plate (2), thereby stabilizing the clasped closure of the aforesaid cover plate (2) to prevent the occurrence of separation and opening (as depicted in the situation of FIG. 3).

What is claimed is:

1. An in-vehicle cup holder comprising:

a mounting plate, a cover plate pivotally mounted on said mounting plate, a left clip arm and a right clip arm mounted on said mounting plate and a clip arm rod for mounting said left clip arm and said right clip arm on said mounting plate, two lateral walls of a body of the mounting plate each including a lock tab, and the lock tabs having protruding knobs located on the lateral walls adjacent to said clip arm rod, a hole molded into each of two lateral containment edges of said cover plate in an aligned configuration with said lock tabs of said mounting plate such upon completion of usage, the cover plate is fastened to the mounting plate and held securely in position by the two lock tabs which are clasped to the cover plate at the respective hole in the lateral containment edge of the cover plate, thereby preventing separation, and opening and falling of the cover plate; and, furthermore, will not vibrate or produce unpleasant sounds even in a moving vehicle.

2. An in-vehicle cup holder comprising:

a mounting plate, a left clip arm and a right clip arm mounted on said mounting plate and a clip arm rod for mounting said left clip arm and said right clip arm on said mounting plate, two lateral walls of a body of the mounting plate each including a lock tab, and the lock tabs having protruding tabs extending horizontally adjacent to said clip arm rod and from walls of said mounting plate positioned laterally inside each opposing side of two lateral containment edges of a cover plate.

3. The in-vehicle cup holder as claimed in claim 1, wherein the lock tabs positioned on the two lateral walls of the mounting plate body include intervals fabricated in between the two sides of the lock tabs and the two lateral walls to enable the lock tabs to readily and flexibly slant inward and open outward.

4. The in-vehicle cup holder as claimed in claim 2, wherein the cover plate includes a recess that is positioned laterally inside each opposing side of the two lateral containment edges of the cover plate.

5. The in-vehicle cup holder as claimed in claim 2, wherein the lock tabs positioned on the walls of the mounting plate include intervals fabricated in between the two sides of the lock tabs and the walls to enable the lock tabs to readily and flexibly slant inward and open outward.

* * * * *